2 Sheets—Sheet 1.

W. C. MURDOCH & E. K. HAYNES, dec'd.,

J. CARNRICK and G. D. COANEY, Assignees, by mesne assignments.

Apparatus for Dipping and Coating Confections.

No. 9,286. Reissued July 6, 1880.

WITNESSES.
H. A. Parker
Chas. H. Duval

John Carnrick
George D. Coaney
Assignees by Mesne Assignment of William C. Murdoch and Edgar K. Haynes
Inventors.

2 Sheets—Sheet 2.

W. C. MURDOCH & E. K. HAYNES, dec'd.,

J. CARNRICK and G. D. COANEY, Assignees, by mesne assignments.

Apparatus for Dipping and Coating Confections.

No. 9,286. Reissued July 6, 1880.

WITNESSES.
H. A. Parker
Chas. H. Dorsab

John Carnrick
George D. Coaney
Assignees by Mesne Assignment of William C. Murdoch and Edgar K. Haynes
Inventors.

UNITED STATES PATENT OFFICE.

JOHN CARNRICK, OF CRESSKILL, AND GEORGE D. COANEY, OF BAYONNE, NEW JERSEY, ASSIGNEES, BY MESNE ASSIGNMENTS, OF WILLIAM C. MURDOCH AND EDGAR K. HAYNES, BOTH DECEASED.

APPARATUS FOR DIPPING AND COATING CONFECTIONS.

SPECIFICATION forming part of Reissued Letters Patent No. 9,286, dated July 6, 1880.

Original No. 98,615, dated January 4, 1870. Application for reissue filed April 15, 1880.

*To all whom it may concern:*

Be it known that WILLIAM C. MURDOCH and EDGAR K. HAYNES, both late of the city of Boston, in the county of Suffolk and State of Massachusetts, both deceased, in their lifetime invented certain new and useful Improvements in Apparatus for Dipping and Coating Confections; and we do hereby declare that the following is a full, clear, and exact description thereof, reference being had to the accompanying drawings, and to the letters of reference marked thereon, in which—

Figure 1:
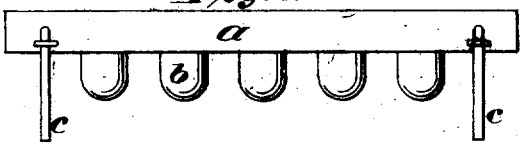
Figure 2:
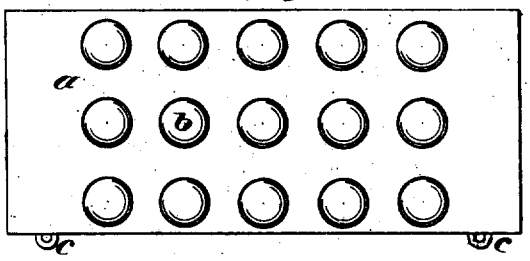
Figure 3:
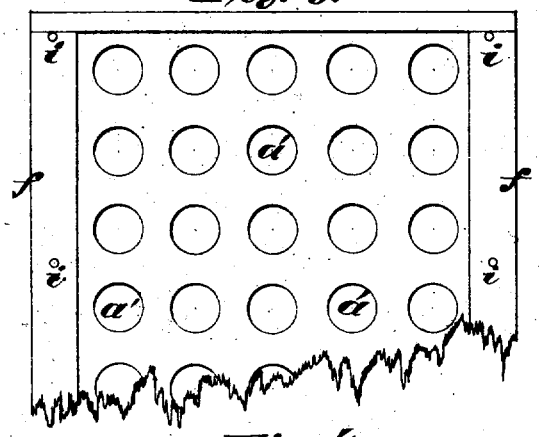
Figure 4:
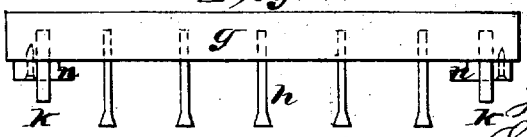
Figure 5:
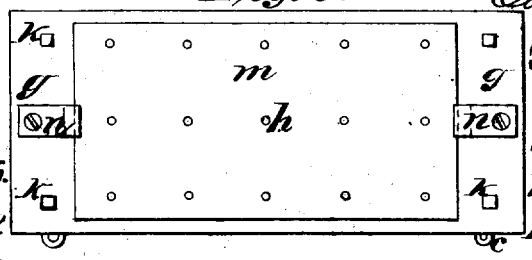
Figure 6:
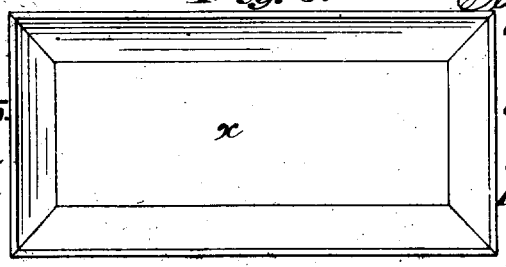

Figure 1 is a side or edge view, and Fig. 2 is an inverted plan view, of a device used for forming the molds for molding the confections. Fig. 3 is a plan view of the molds in which the confections are intended to be formed, and in which said confections are held while receiving the pins of the pin-board, as hereinafter explained. Fig. 4 is a side or edge view, and Fig. 5 an inverted plan view, of the said pin-board. Fig. 6 is a plan view of a pan for holding the coating material into which the confections when affixed to the pins of the pin-board are dipped. Figs. 7, 8, 9, 10, 11, and 12 are side or edge views, illustrating the various stages of the operation of coating the confections and the positions of the different parts of the apparatus at or during said several stages.

In the use or operation of the invention a series of molds are provided in which the confections are formed. A pin-board having a number of pins corresponding to the number of molds is inserted in the confection, so that said confections will adhere one to each of the pins. This done, the pin-board is lifted, carrying the confections with it, and is then lowered over a pan containing the coating material in a more or less fluid condition until the confections are immersed in the said coating material. This done, the pin-board, together with the confections attached to the pins thereof, is lifted away from the coating material, which adheres to a greater or less thickness upon the surface of the confections. This coating material being suffered to become more or less dry upon the confections, the latter are removed from the pins.

By this process of separately and simultaneously coating quantities of the articles of confection, the work may be done in a very small fraction of the time required by the methods in use before the invention of the said MURDOCH and HAYNES, and not only much more cheaply, but in a better manner.

This process and apparatus may be used in the manufacture of chocolate-drops and other confections.

Figure 7:
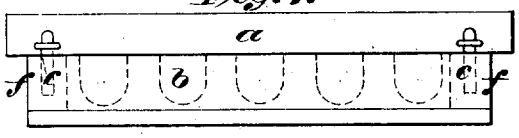
Figure 8:
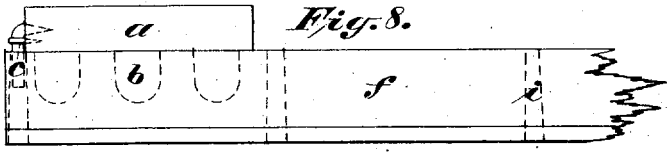

For the manufacture or coating of chocolate-drops the *modus operandi* is as follows: A tray, *f*, is filled with starch, and into the upper surface of this starch are forced the knobs *b* of the mold-board *a*, thereby forming in the upper surface of the starch a series of molds or cavities, *a'*. In order to facilitate the application of the mold-board in the formation of the molds or cavities *a'*, as just described, the sides of the tray *f* are provided with vertical holes *i*, and the mold-board *a* is provided with a corresponding number of guide-pins, *c*, so that by causing the guide-pins *c* to pass downward in the holes *i* the mold-board is brought in proper position with reference to the tray *f*, and the downward movement of said mold-board *a*, with its knob *b*, is guided vertically during the formation of the molds or cavities *a'*. The position of the mold-board *a* with reference to the tray *f* at this stage is indicated in Figs. 7 and 8, the mold-board *a* being placed transverse to the tray *f* and applied in succession at different parts along the length of the said tray *f* to form the molds or cavities throughout more or less the length of the same, according as a greater or less number of said molds or cavities are desired. The mold-board *a* being lifted away from the tray *f*, there remains in the latter a series or number of the cavities or molds, *a'*, in which the confection or drops may be molded by simply placing the material in the said cavities or molds *a'*.

*g* is the pin-board, which may be of substantially the same size and shape as the mold-board *a*. Projecting from the under side of the said pin-board are a number of wires or pins, *h*, which correspond in position with the knobs *b* on the mold-board *a*. Placed on the under side of the pin-board *g* is a false bottom, *m*. (Represented in Figs. 5, 10, 11, and 12.) This false bottom *m* is provided with a number of holes, through which the pins *h* are passed, the board being slipped upon the pins and brought up against the under side of the pin-board.

At *n* are buttons, which, when turned in one direction, lap over the adjacent edges of the false bottom *m* and retain the same against the under side of the mold-board *a*—in other words, at the inner ends of the pins *h*—but when turned in the opposite direction will release the said false bottom.

The pin-board *g* is provided with guide-pins, which should correspond in position with the guide-pins *c* on the mold-board *a*, so that when the pin-board *g* is placed over the tray *f* its said guide-pins, passing down into the holes *i*, will direct the pins *h* vertically into the cavities or molds *a'* as near the center thereof as may be. The said cavities or molds having been filled by the confection to be coated, the pin-board *g* is placed in the position last described—that is to say, with its guide-pins in the holes *i*—and the said pin-board being forced downward, its pins *h* pass into the central portions of the confections situated in the molds or cavities *a'*, the said confections being thereby attached to the outer extremities of the pins *h*, so that when the pin-board *g* is lifted the confections are retained upon the said pins *h*, one confection upon each pin, and are carried thereby.

The pan shown in Fig. 6 being filled to the requisite degree with the coating material, as at *x*, the pin-board *g* is lowered over said pan until the confections on the outer extremities of the pins *h* are immersed in said coating material. This done, the pin-board is lifted, thus withdrawing the confections from the coating material, each of the said confections being separately coated to a greater or less thickness with the material in which it has just been immersed. The coating is then allowed to dry to the requisite degree upon the confections, which done, the buttons *n* are turned to release the false bottom *m*, and the latter is pushed downward and outward toward the outer extremities of the pins *h*, and is thereby caused to thrust or simultaneously push off the confections from the ends of the said pins.

When desired, before applying the pin-board *g* to use, as described, a layer of paper may be placed upon the lower or outer side of the false bottom, (the pins *h* being, of course, passed through the paper,) the paper being held in position by turning the buttons *n* over the edge of the paper as well as over the edge of the false bottom.

Figure 9:
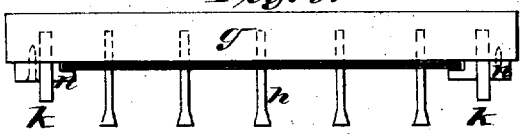
Figure 10:
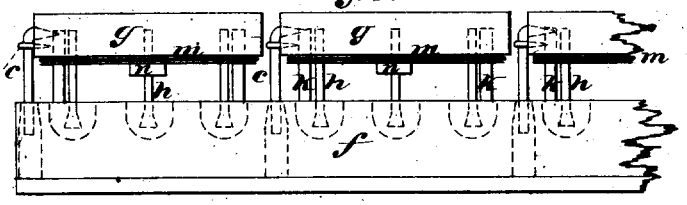
Figure 11:
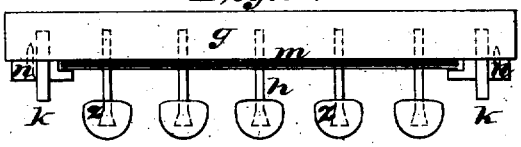
Figure 12:
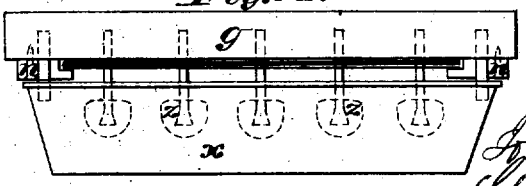

When the confections are of comparatively soft material, as in the case of the chocolate-drops, the outermost extremities of the pins *h* may be broadened by flattening, as shown in Figs. 4 and 9, in order to have a retentive hold in said soft material in lifting the same.

In order to prevent the pins *h* from going too deep into the confection, and in order to insure a space between the pin-board and the confections as the latter are attached to the pins *h*, the pin-board is provided with stops *k*, which are arranged to rest on the top of the part having the molds or cavities when the pin-board is brought down over the molds or cavities to attach the confections to the pins *h*, as hereinbefore explained.

What is claimed as the invention of the said WILLIAM C. MURDOCH and EDGAR K. HAYNES is—

1. A plate or board having pins for carrying the articles to be dipped, in combination with a holder for holding the articles in position for the insertion of the pins, substantially as and for the purpose herein set forth.

2. The implement for dipping or coating articles, consisting of a plate or board having the pins *h* for retaining the articles out of contact with each other and supporting the same during the operation of simultaneously dipping the articles attached to the said pins, substantially as and for the purpose herein set forth.

3. The combination of a stripping device with the pin-board constructed with the series of pins *h*, said stripping device being constructed for insertion behind the articles to be simultaneously stripped from the pins, substantially as and for the purpose herein set forth.

4. The combination of the pin-board constructed with the series of pins *h* with a device having a series of cavities for holding the articles to be coated while the pins of the said implement are inserted therein, substantially as and for the purpose herein set forth.

5. The combination of the pin-board constructed with the series of pins *h*, the device having a series of cavities correspondent in number and position with the pins of the said implement, and a stripping device, all substantially as and for the purpose herein set forth.

6. The combination of the false bottom *m* with the pins of the dipping pin-board, substantially as and for the purpose herein set forth.

7. The combination of stops with the pin-board, for the purpose of regulating the depth to which the pins may be inserted in the articles to be dipped or coated, substantially as herein set forth.

8. The combination of the stops *k*, false bottom *m*, and the pin-board constructed with the series of pins *h*, substantially as and for the purpose herein set forth.

9. The combination, with the pin-board constructed with the series of pins *h*, of the buttons *n*, false bottom *m*, and stops *k*, substantially as and for the purpose herein set forth.

10. The combination of the sheet or layer of paper with the pins *h* of the pin-board, the false bottom *m*, the stops *k*, and buttons *n*, all substantially as and for the purpose herein set forth.

JOHN CARNRICK,
GEORGE D. COANEY,
*Assignees, by mesne assignments, of William C. Murdoch and Edgar K. Haynes, deceased.*

Witnesses:
H. F. PARKER,
CHAS. H. DOXAT.